(12) United States Patent
Burket et al.

(10) Patent No.: US 6,870,728 B1
(45) Date of Patent: Mar. 22, 2005

(54) ELECTROLYTIC CAPACITOR

(75) Inventors: Chris T. Burket, Huntington Beach, CA (US); Yumiko Yoshihara, Chuo-ku (JP); Masaaki Kobayashi, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/765,880

(22) Filed: Jan. 29, 2004

(51) Int. Cl.[7] .......................... H01G 9/10; H01G 9/04
(52) U.S. Cl. ................... 361/538; 361/533; 361/528
(58) Field of Search ........................... 361/532–533, 361/537–538, 540, 523–524, 528–529, 531

(56) References Cited

U.S. PATENT DOCUMENTS

| | | | |
|---|---|---|---|
| 3,579,813 A | * | 5/1971 | Tomiwa ................. 29/25.03 |
| 4,831,494 A | | 5/1989 | Arnold |
| 5,369,545 A | | 11/1994 | Bhattacharyya |
| 5,880,925 A | | 3/1999 | DuPre |
| 6,813,140 B1 | * | 11/2004 | Huntington ............. 361/528 |
| 2003/0169561 A1 | * | 9/2003 | Ohya et al. ............. 361/529 |
| 2003/0182781 A1 | * | 10/2003 | Miki et al. ............. 29/25.03 |

FOREIGN PATENT DOCUMENTS

| | | |
|---|---|---|
| JP | Y2 06-31715 | 2/1994 |
| JP | A 7-27144 | 1/1995 |
| JP | A 2001-102252 | 4/2001 |
| JP | A 2001-307955 | 11/2001 |
| JP | A 2002-313676 | 10/2002 |

* cited by examiner

Primary Examiner—Eric Thomas
(74) Attorney, Agent, or Firm—Oliff & Berridge PLC

(57) ABSTRACT

An electrolytic capacitor with a further lowered impedance is provided. In the electrolytic capacitor in accordance with the present invention, respective currents directed opposite from each other flow through anode and cathode vias extending along the thickness of a substrate. The anode vias are lopsidedly located in a marginal area of an anode electrode pattern, and thus are disposed significantly close to the cathode vias formed in a cathode electrode pattern disposed close to the anode electrode pattern. The cathode vias are lopsidedly located in a marginal area of the cathode electrode pattern, and thus are disposed significantly close to the anode vias. Since the anode and cathode vias are formed close to each other as such, this electrolytic capacitor achieves a lower ESL, thereby attaining an impedance lower than that of a conventional electrolytic capacitor.

8 Claims, 12 Drawing Sheets

Fig.6
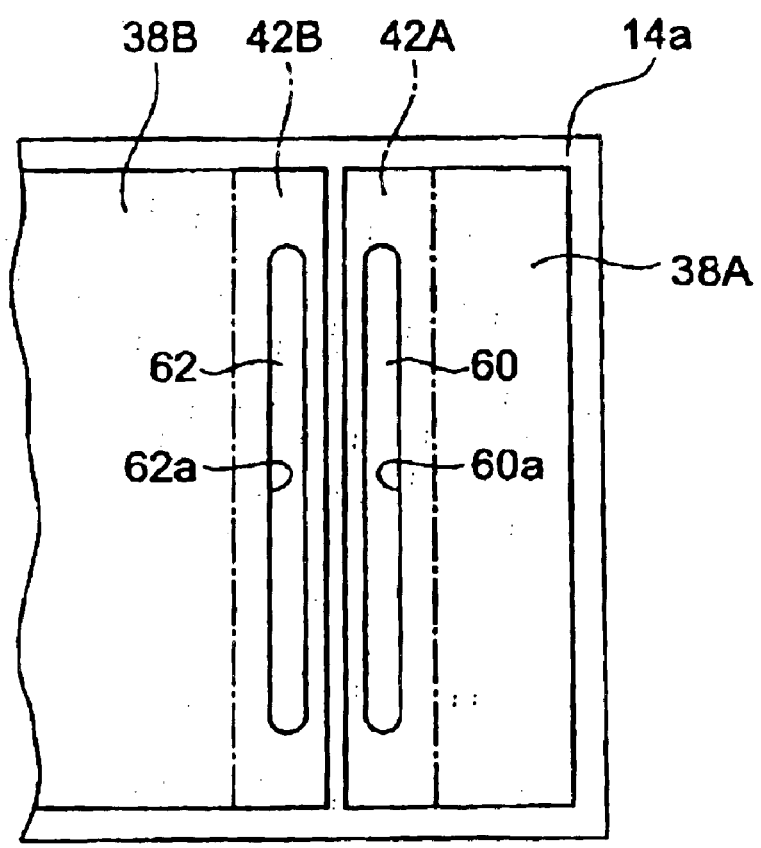
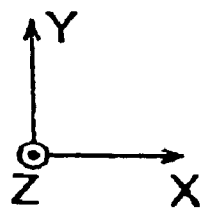

ELECTROLYTIC CAPACITOR

BACKGROUND OF THE INVENTION

1. Field of the Invention

The present invention relates to an electrolytic capacitor.

2. Related Background Art

In general, a capacitor device employed in an electrolytic capacitor is made by using a metal (so-called valve metal) capable of forming an insulative oxidized film, such as aluminum, titanium, and tantalum, as an anode; forming an insulative oxidized film by anodizing the surface of the valve metal; then forming a solid electrolyte layer made of an organic compound or the like substantially functioning as a cathode; and further providing a conductive layer made of graphite, silver, or the like as a cathode.

Known as methods for achieving a low impedance in such an electrolytic capacitor are those lowering equivalent series inductance (ESL) and equivalent series resistance (ESR). An electrolytic capacitor omitting a lead frame for lowering ESR is disclosed in Japanese Patent Application Laid-Open No. 2001-102252. The electrolytic capacitor disclosed in this publication is one in which a two-terminal type capacitor device having a pair of electrodes is mounted on one face of a substrate, whereas an electrode on the device mounting surface of the substrate and an electrode on the backside are connected to each other via a through hole.

However, the following problem exists in the above-mentioned conventional electrolytic capacitor. Namely, since the distance between the anode electrode and cathode electrode formed on the device mounting surface is long, the distance between a pair of through holes extending along the thickness of the substrate from the anode and cathode electrodes is long. Therefore, the conventional electrolytic capacitor has been problematic in that the ESL caused by currents flowing through these through holes is so high that impedance is not lowered sufficiently.

For solving the above-mentioned problem, it is an object of the present invention to provide an electrolytic capacitor with a further lowered impedance.

SUMMARY OF THE INVENTION

The present invention provides an electrolytic capacitor comprising a capacitor device formed with anode and cathode parts; and a substrate having one face formed with an anode electrode pattern connected to the anode part and a cathode electrode pattern connected to the cathode part, the anode and cathode electrode patterns being adjacent to each other, the substrate being further formed with a first conductive path extending along a thickness of the substrate from the anode electrode pattern to the other face and a second conductive path extending along the thickness of the substrate from the cathode electrode pattern to the other face; wherein the first conductive path is lopsidedly located in a marginal area of the anode electrode pattern on the cathode electrode pattern side; and wherein the second conductive path is lopsidedly located in a marginal area of the cathode electrode pattern on the anode electrode pattern side.

Through the first and second conductive paths extending along the thickness of the substrate in this electrolytic capacitor, respective currents flow in directions opposite from each other. The first conductive path is lopsidedly located in the marginal area of the anode electrode pattern on the cathode electrode pattern side, and thus is disposed significantly close to the second conductive path formed in the cathode electrode pattern. On the other hand, the second conductive path formed in the cathode electrode pattern is lopsidedly located in the marginal area on the anode electrode pattern side, and thus is disposed significantly close to the first conductive path. Since the first and second conductive paths are formed close to each other as such, this electrolytic capacitor achieves a lower ESL, thereby attaining an impedance lower than that of the conventional electrolytic capacitor.

Preferably, the anode electrode pattern is formed with a plurality of first conductive paths, the cathode electrode pattern is formed with the same number of second conductive paths as that of the first conductive paths, and the first and second conductive paths corresponding to each other align with each other along a direction in which the anode and cathode electrode patterns align with each other. In this case, each pair of the first and second conductive paths corresponding to each other contribute to lowering the ESL, whereby the ESL can be reduced more effectively.

Preferably, each of the first and second conductive paths has a cross section extending in one direction, and the first and second conductive paths corresponding to each other extend in parallel. In this case, the first and second conductive paths contribute to lowering the ESL over a wide area, whereby the ESL can be reduced more effectively.

In another aspect, the present invention provides an electrolytic capacitor comprising a capacitor device having a plurality of anode parts formed on a base and a cathode part formed at an outer surface of the base excluding the anode parts; and a substrate having one face formed with a plurality of anode electrode patterns connected to the respective anode parts and a cathode electrode pattern connected to the cathode part, the anode and cathode electrode patterns being adjacent to each other, the substrate being further formed with a first conductive path extending along a thickness of the substrate from each anode electrode pattern to the other face and a second conductive path extending along the thickness of the substrate from the cathode electrode pattern to the other face; wherein the first conductive path is lopsidedly located in a marginal area of each anode electrode pattern on a side where the cathode electrode pattern is positioned, and wherein the second conductive path is lopsidedly located in each of a plurality of marginal areas of the cathode electrode pattern where the respective anode electrode patterns are positioned.

Through the first and second conductive paths extending along the thickness of the substrate in this electrolytic capacitor, respective currents flow in directions opposite from each other. The first conductive path formed in each anode electrode pattern is lopsidedly located in the marginal area of each anode electrode pattern on a side where the cathode electrode pattern is positioned, and thus is disposed significantly close to the second conductive path formed in the cathode electrode pattern. On the other hand, the second conductive path formed in the cathode electrode pattern is lopsidedly located in each of a plurality of marginal areas where the respective anode electrode patterns are positioned, and thus is disposed significantly close to the first conductive path. Since the first and second conductive paths are formed close to each other as such, this electrolytic capacitor achieves a lower ESL, thereby attaining a lower impedance than that of the conventional electrolytic capacitor.

Preferably, the cathode electrode pattern is formed with a cathode protruded pattern part projecting so that the cathode protruded pattern part is interposed between adjacent anode electrode patterns, and the second conductive paths are lopsidedly located in two marginal areas on respective sides of the cathode protruded pattern part where the adjacent anode electrode patterns are positioned.

Preferably, the cathode electrode pattern is formed with a plurality of cathode protruded pattern parts projecting so that one of the anode electrode patterns is interposed between adjacent cathode protruded pattern parts, and the first conductive paths are lopsidedly located in two marginal areas of the anode electrode pattern held between the cathode protruded pattern parts where the respective cathode protruded pattern parts are positioned.

Preferably, in the anode electrode pattern and cathode protruded pattern part adjacent each other, marginal areas opposing each other are formed with a plurality of first conductive paths and a plurality of second conductive paths whose number is the same as that of the first conductive paths, and the first and second conductive paths corresponding to each other align with each other along a direction in which the anode electrode pattern and the cathode protruded pattern part align with each other. In this case, each pair of the first and second conductive paths aligning along a direction in which the anode electrode pattern and the cathode protruded pattern part align with each other contribute to lowering the ESL, whereby the ESL can be reduced more effectively.

Preferably, each of the first and second conductive paths has a cross section extending in one direction, and the first and second conductive paths corresponding to each other extend in parallel. In this case, the first and second conductive paths contribute to lowering the ESL over a wide area, whereby the ESL can be reduced more effectively.

BRIEF DESCRIPTION OF THE DRAWINGS

FIG. 4A is a view showing the device mounting surface of a substrate, whereas

FIG. 6 is a view showing anode and cathode vias in a different mode of the electrolytic capacitor in accordance with the first embodiment;

FIG. 9A is a view showing the device mounting surface of a substrate, whereas

FIG. 11A is a view showing the device mounting surface of a comparative substrate, whereas FIG. 12A is a view showing the device mounting surface of a comparative substrate, whereas

DESCRIPTION OF THE PREFERRED EMBODIMENTS

In the following, modes considered to be the best when embodying the electrolytic capacitor in accordance with the present invention will be explained in detail with reference to the accompanying drawings. Constituents identical or equivalent to each other will be referred to with numerals identical to each other without repeating their overlapping explanations if any.

Figure 1:
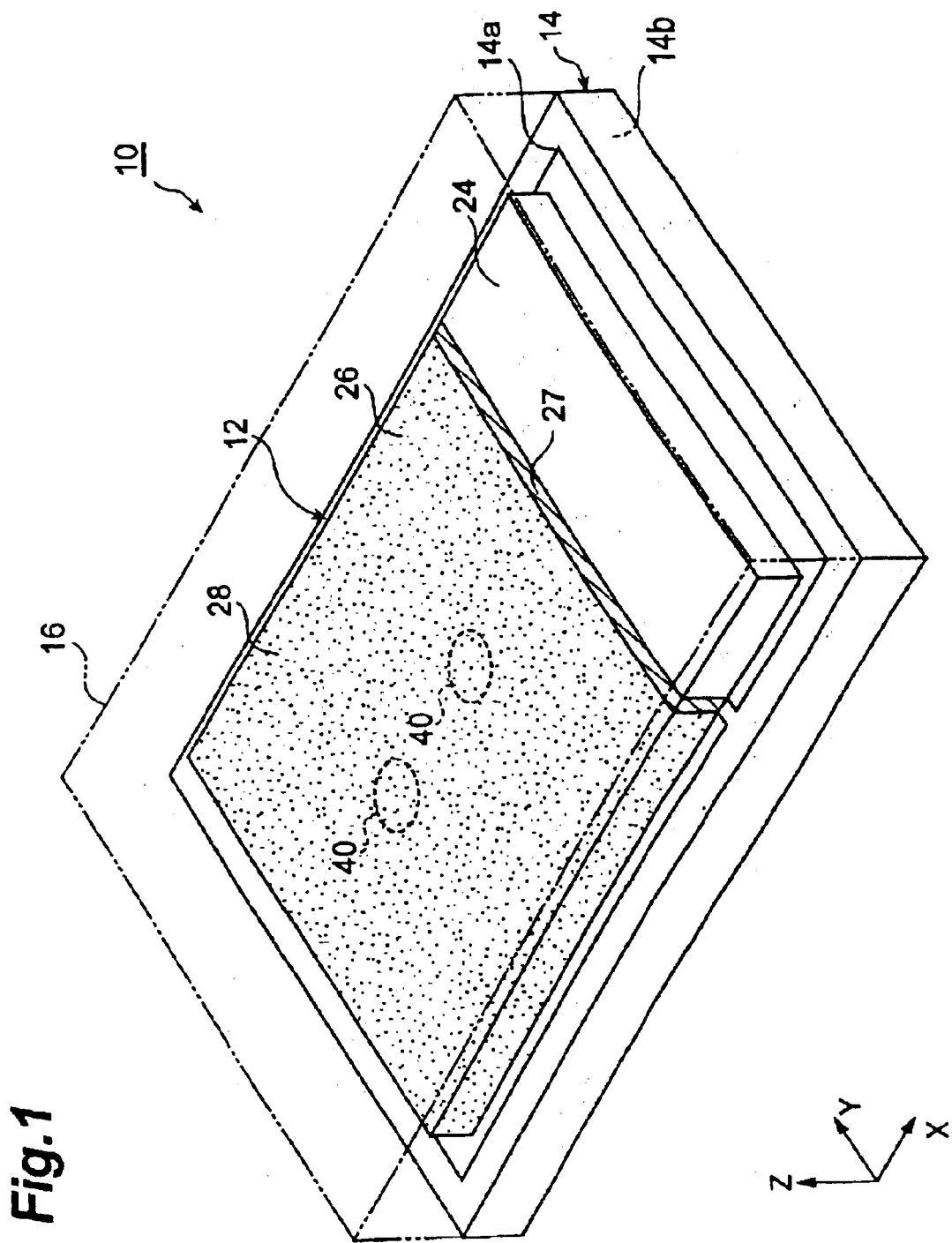
FIG. 1 is a perspective view showing the electrolytic capacitor in accordance with a first embodiment of the present invention.

(First Embodiment) FIG. 1 is a perspective view showing the electrolytic capacitor in accordance with a first embodiment of the present invention. As shown in FIG. 1, this electrolytic capacitor 10 comprises a capacitor device 12, a substrate 14 shaped like a rectangular thin sheet on which the capacitor device 12 is disposed, and a resin mold 16 which molds the capacitor device 12 and substrate 14.

Figure 2:
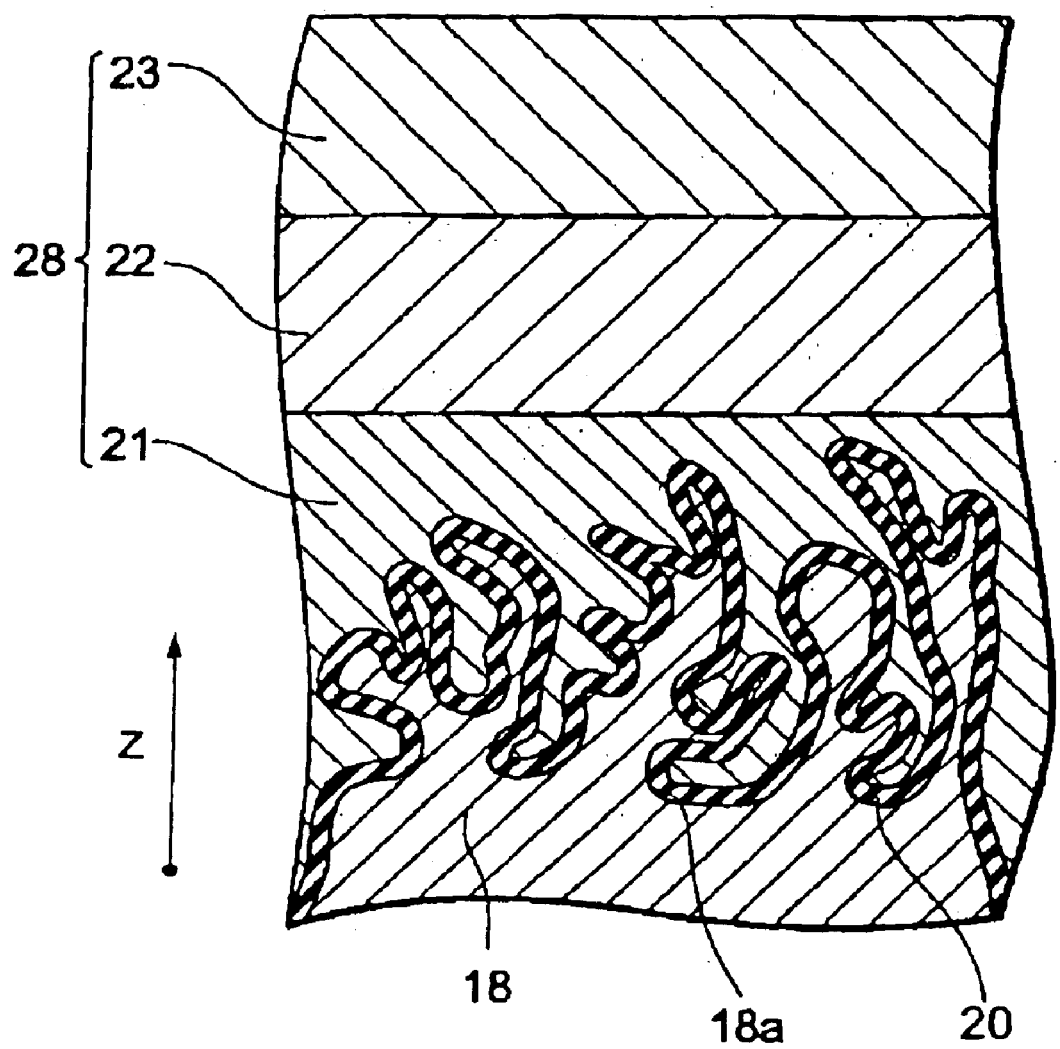
FIG. 2 is a schematic sectional view showing a main part of the electrolytic capacitor shown in FIG. 1.

The capacitor device 12 is one in which a solid high-molecular electrolytic layer and a conductive layer are successively laminated in a partial region (explained later) on a foil-like aluminum base (valve metal base) whose surface is subjected to roughening (surface area expansion) and chemical conversion. Referring to FIG. 2, more detailed explanations will be set forth. FIG. 2 is a schematic sectional view showing a main part of the electrolytic capacitor 10 shown in FIG. 1. As shown in FIG. 2, an aluminum base 18 roughened by etching is subjected to chemical conversion, i.e., anodization, whereby its surface 18a is formed with an insulative aluminum oxide film 20. Recesses in the expanded surface area of the aluminum base 18 are filled with a solid high-molecular electrolytic layer 21. The solid high-molecular electrolytic layer 21 enters the recesses of the aluminum base 18 while in a monomer state and then is polymerized upon chemical oxidization or electrolytic oxidization.

On the high-molecular solid electrolytic layer 21, a graphite paste layer 22 and a silver paste layer 23 (conductive layer) are successively formed by any of screen printing, impregnation (dipping), and spray coating. The high-molecular solid electrolytic layer 21, graphite paste layer 22, and silver paste layer 23 constitute a cathode electrode of the capacitor device 12.

As shown in FIG. 1, the capacitor device 12 is shaped like a rectangular thin sheet, and is constituted by an anode part 24 which is an end part in the longer side direction and an accumulator 26 which is the part left by the anode part 24. In the following, for convenience of explanation, the longer and shorter side directions of the capacitor device 12 will be referred to as X and Y directions, respectively, and a direction orthogonal to the X and Y directions will be referred to as Z direction.

As shown in FIG. 2, the anode part 24 is constituted by the aluminum base 18 formed with the aluminum oxide film 20. On the other hand, the accumulator 26 has a structure in which the outer surface of the aluminum base 18 formed with the aluminum oxide film 20 functioning as a dielectric is covered with a cathode part 28 constituted by the solid high-molecular electrolytic layer 21, graphite paste layer 22, and silver paste layer 23. A band-like area between the anode part 24 and accumulator 26 is formed with an insulative resin layer 27 made of an epoxy or silicone resin.

The capacitor device 12 having the form mentioned above is shaped by punching an aluminum foil whose surface has been subjected to roughening and chemical conversion. Hence, the shaped aluminum foil is dipped into a chemical conversion solution, so as to form an aluminum oxide film at an end face of the foil where aluminum is exposed. A preferred example of the chemical conversion solution is an aqueous ammonium adipate solution having a concentration of 3%.

Figure 3:
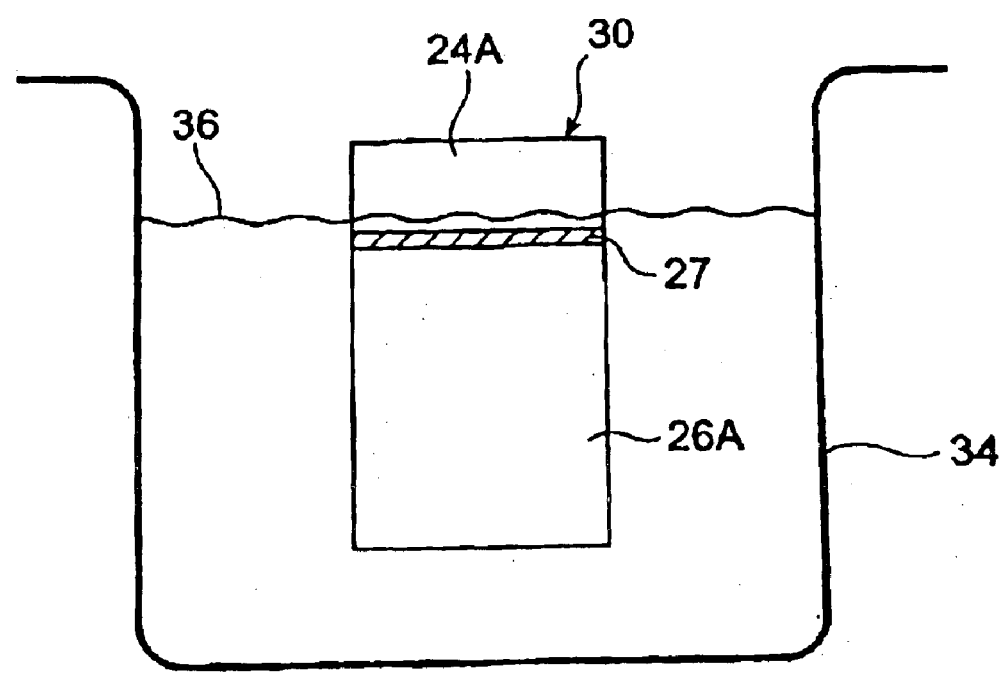
FIG. 3 is a view showing a state where an aluminum foil to become a capacitor device is subjected to anodization.

With reference to FIG. 3, a process to which an aluminum foil 30 to become the capacitor device 12 is subjected will now be explained. FIG. 3 is a view showing a state where an aluminum foil to become the capacitor device 12 is subjected to anodization. First, the insulative resin layer 27 is formed in a band-like marginal area on the side of a part 26A to become the accumulator 26 in a surface area of a part 24A to become the anode part 24 in the aluminum foil 30. Forming the insulative resin layer 27 in a predetermined area as such reliably insulates and separates the anode part 24 and cathode part 28, which will be formed in a later stage, from each other.

Subsequently, while being supported by the part 24A to become the anode part 24, the aluminum foil 30 is dipped into a chemical conversion solution 36 constituted by an aqueous ammonium adipate solution contained in a stainless beaker 34. Then, a voltage is applied such that thus supported aluminum foil part 24 and the stainless beaker 34 become positive and negative, respectively. The value of applied voltage can be determined appropriately depending on the thickness of the aluminum oxide film 20 formed. When forming the aluminum oxide film 20 having a thickness of 10 nm to 1 $\mu$m, the voltage is usually on the order of a few volts to 20 volts.

When anodization is started by voltage application, the chemical conversion solution 36 infiltrates upwards from the liquid level by way of the roughened surface of the aluminum foil 30 because of a capillary phenomenon. As a consequence, the aluminum oxide film 20 is formed over the whole roughened surface of the aluminum foil 30 including end faces. Thus produced aluminum foil 30 is formed with the cathode part 28 by a known method, whereby the making of the capacitor device 12 is completed.

Figure 4A:
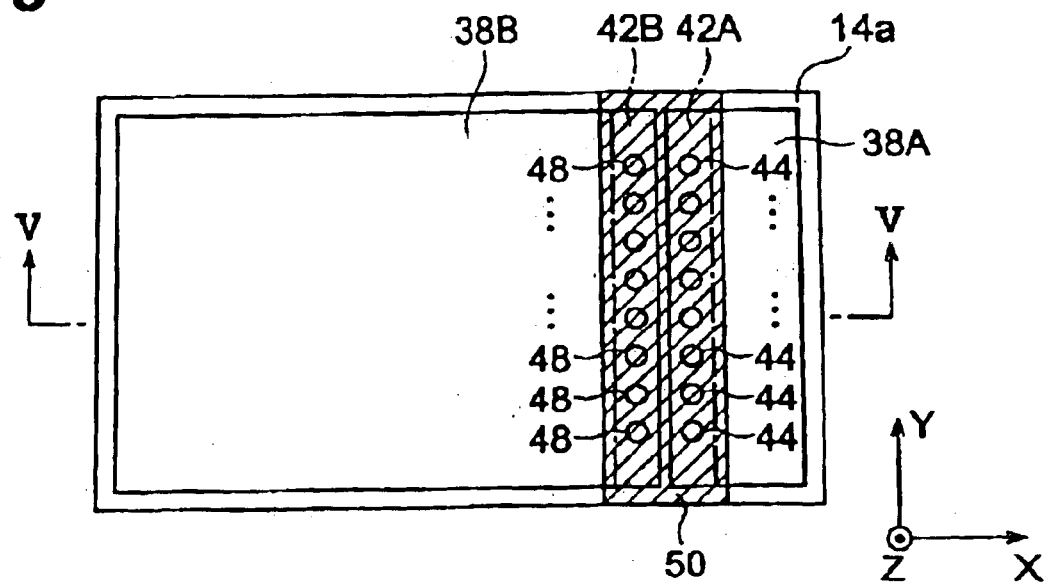
Figure 4B:
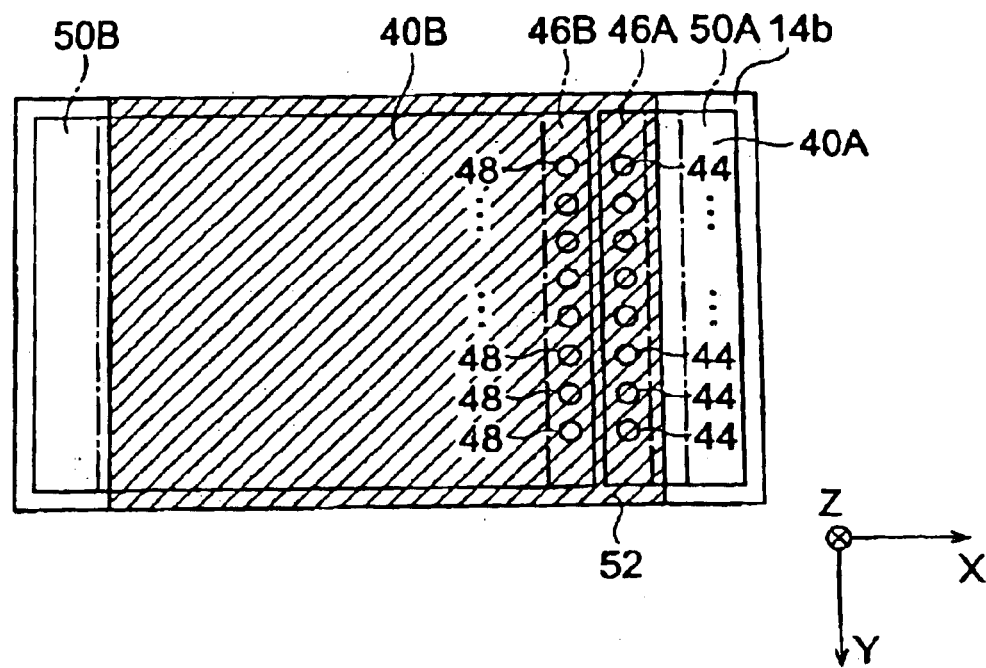
FIG. 4B is a view showing the backside of the device mounting surface of the substrate.

The substrate 14 on which the capacitor device 12 is mounted will now be explained with reference to FIGS. 4A and 4B. Here, FIG. 4A is a view showing a device mounting surface 14a of the substrate 14, whereas FIG. 4B is a view showing the backside 14b of the device mounting surface 14a of the substrate 14.

The substrate 14 is a printed circuit board made of an FR4 material (epoxy resin material) having both sides 14a, 14b printed with copper foil patterns with predetermined forms made by etching. On the device mounting surface 14a of the substrate 14 on which the capacitor device 12 is mounted, two rectangular electrode patterns 38A, 36B are arranged in parallel along the X direction as shown in FIG. 4A, whereas each of the neighboring edges of the adjacent electrode patterns 38A, 38B extends in the Y direction. The electrode patterns 38A and 38B are disposed close to each other with only a small distance therebetween, and cover substantially the whole area of the substrate surface 14a.

The anode part 24 of the capacitor device 12 is connected to the narrower electrode pattern 38A in the pair of electrode patterns 38A, 38B by resistance welding or metal spot welding with a YAG laser or the like. On the other hand, the cathode part 28 on the surface of the accumulator 26 of the capacitor device 12 is connected to the wider electrode pattern 38B with a conductive adhesive 40 (see FIG. 1). In the following, for convenience of explanation, the electrode pattern 38A connected to the anode part 24 of the capacitor device 12 will be referred to as anode electrode pattern, whereas the electrode pattern 38B connected to the cathode part 28 of the capacitor device 12 will be referred to as cathode electrode pattern. The backside 14b of the device mounting surface 14a of the substrate 14 is formed with an anode land pattern 40A and a cathode land pattern 40B which are in conformity to the forms of the anode electrode pattern 38A and cathode electrode pattern 38B, respectively.

In the region formed with the anode electrode pattern 38A, a marginal area 42A on the cathode electrode pattern 38A side is formed with eight anode vias (first conductive paths) 44 equally distanced along the Y direction, which is the longer side direction of the anode electrode pattern 38A. The anode vias 44 are connected to the anode electrode pattern 38A and extend in the thickness direction (z direction) of the substrate 14. The anode vias 44 reach the anode land pattern 40A on the backside, and are connected to the anode land pattern 40A in a marginal area 46A on the cathode land pattern 40B side of the region formed with the anode land pattern 40A.

In the region formed with the cathode electrode pattern 38B, a marginal area 42B on the anode electrode pattern 38A side is formed with eight cathode vias (second conductive paths) 48 at the same interval as with the anode vias 44 along the Y direction, which is the shorter side direction of the cathode electrode pattern 38A. The cathode vias 48 are connected to the cathode electrode pattern 38B, and extend in the thickness direction (Z direction) of the substrate 14 as with the anode vias 44. The cathode vias 48 reach the cathode land pattern 40B on the backside, and are connected to the cathode land pattern 40B in a marginal area 46B on the anode land pattern 40A side in the region formed with the cathode land pattern 40B. Among the anode vias 44 and cathode vias 48, those corresponding to each other align in the X direction. Each of the anode vias 44 and cathode vias 48 has a circular cross section and is formed by electroless copper plating of a circular through hole drilled in the substrate 14.

Namely, the anode vias 44 and cathode vias 48 are formed in the respective marginal areas 42A, 42B of the anode electrode pattern 38A and cathode electrode pattern 38B adjacent each other, whereby the distance therebetween is significantly reduced. Also, each corresponding pair of the anode via 44 and cathode via 48 align with each other along the X direction in which the anode electrode pattern 38A and cathode electrode pattern 38B align with each other, thereby minimizing the distance therebetween.

The device mounting surface 14a of the substrate 14 is formed with an insulative resin layer 50 integrally covering the marginal areas 42A and 42B. The insulative resin layer 50, which separates and insulates the electrode patterns 38A and 38B from each other, can employ materials such as epoxy and silicone resins and is formed by coating with a thickness of several tens of microns. On the other hand, the backside 14b of the device mounting surface 14a of the substrate 14 is formed with an insulative resin layer 52 integrally covering the marginal area 46A of the anode land pattern 40A and the marginal area 46B of the cathode land pattern 40B, from which the land patterns 40A, 40B are exposed only in marginal areas 50A, 50B opposing the marginal areas 46A, 46B, respectively. The insulative resin layer 52 is used for separating and insulating the land patterns 40A and 40B from each other and, as with the insulative resin layer 50, can employ materials such as epoxy and silicone resins and is formed by coating with a thickness of several tens of microns.

Figure 5:
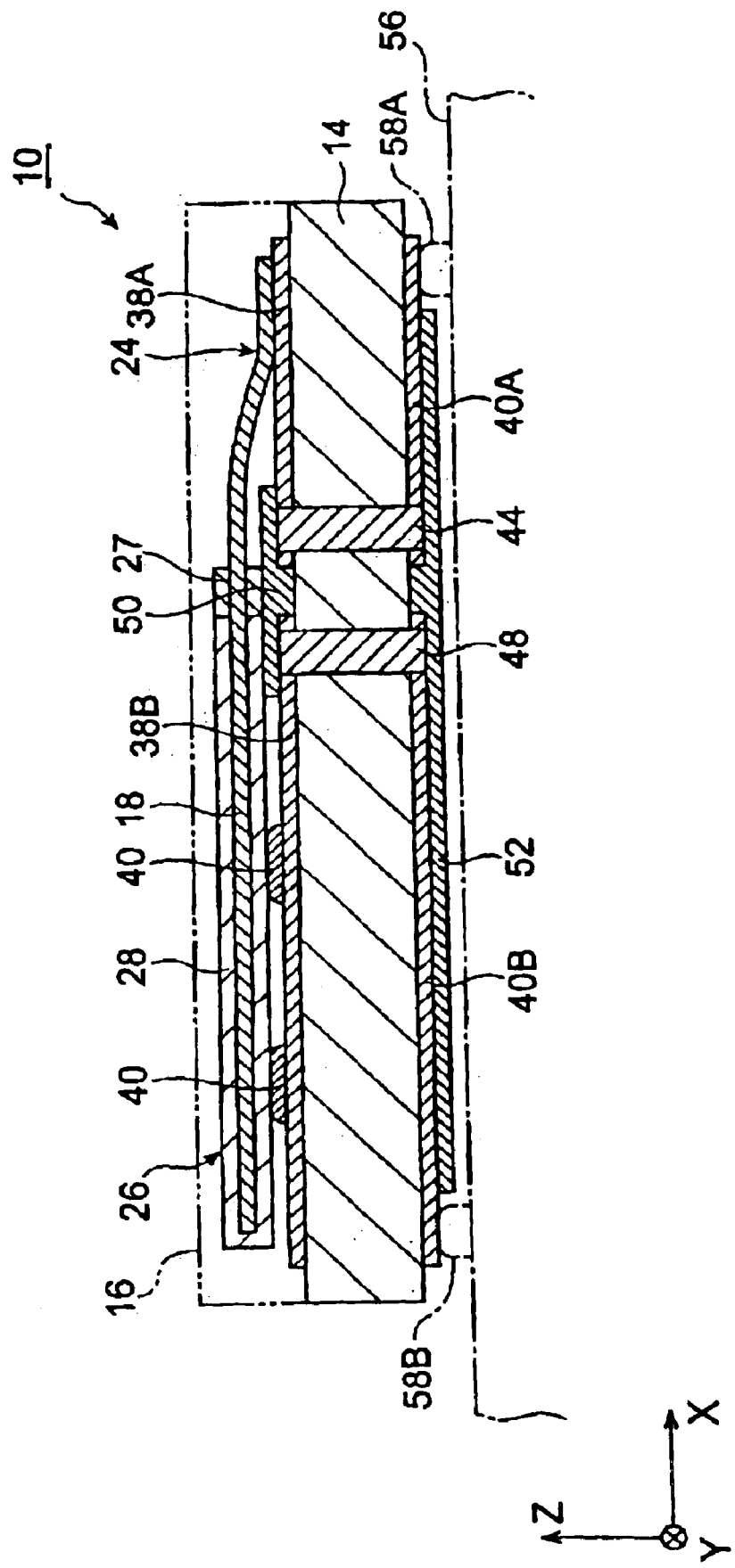
FIG. 5 is a sectional view, taken along the line V—V of FIG. 4A, showing a state where the electrolytic capacitor is mounted on a mounting substrate.

With reference to FIG. 5, a mode of mounting the electrolytic capacitor 10 onto a mounting substrate will now be explained. FIG. 5 is a sectional view, taken along the line V—V of FIG. 4A, showing a state where the electrolytic capacitor 10 is mounted on the mounting substrate. The electrolytic capacitor 10 is mounted on the mounting substrate 56 such that the backside 14b of the substrate 14 faces the mounting substrate 56, and that marginal areas 54A, 54B of the land patterns 40A, 40B exposed from the insulative resin layer 52 come into contact with a pair of electrodes 58A, 56B on the mounting substrate 56, respectively. The pair of electrodes 58A, 58B of the mounting substrate 56 are connected to a power supply (and other electronic components) not depicted, and apply a voltage to the electrolytic capacitor 10.

When the voltage is applied to the electrolytic capacitor 10 so that the dielectric part (aluminum oxide film) 20 accumulates electric charges and when thus accumulated electric charges are discharged, currents flow through the anode vias 44 and cathode vias 48. The respective currents flowing through each anode via 44 and each cathode via 48 are directed opposite from each other along the Z axis. Therefore, the magnetic field caused by the current flowing through each anode via 44 and the magnetic field caused by the current flowing through each cathode via 48 cancel each other out, thereby reducing the ESL of the electrolytic capacitor 10. In particular, when the distance between each pair of the anode via 44 and cathode via 48 is significantly reduced as in the electrolytic capacitor 10, the magnetic fields cancel each other out more effectively, thereby further reducing the ESL.

In the electrolytic capacitor 10, as explained in detail in the foregoing, the anode vias 44 are lopsidedly located in the marginal area 42A of the anode electrode pattern 38A and are not formed in other areas of the anode electrode pattern 38A. On the other hand, the cathode vias 48 are lopsidedly located in the marginal area 42B of the cathode electrode pattern 38B and are not formed in other areas of the cathode electrode pattern 38B. Thus, each pair of the anode via 44 and cathode via 48 through which respective currents directed opposite from each other flow are located significantly close to each other, so as to lower the ESL. This decrease in ESL makes the electrolytic capacitor 10 achieve an impedance significantly lower than that of the conventional electrolytic capacitor.

Since each pair of the anode via 44 and cathode via 48 align with each other along the X direction orthogonal to the edge extending direction (Y direction), the distance between the vias is significantly shortened, whereby the ESL of the electrolytic capacitor 10 is reduced more effectively.

In place of the eight pairs of anode vias 44 and cathode vias 48, vias in the mode shown in FIG. 6 may be employed as well. FIG. 6 is a view showing anode and cathode vias in a different mode in the electrolytic capacitor 10 in accordance with the first embodiment. Namely, the anode via 60 and cathode via 62 are formed by filling respective elongated holes 60a and 62a extending in the Y direction along the marginal areas 42A and 42B with a conductive material (e.g., a metal material or a conductive resin). Such anode via 60 and cathode via 62 contribute to lowering the ESL over a wider area and thus are more effective in reducing the ESL than the anode and cathode vias not extending along marginal areas.

Figure 7:
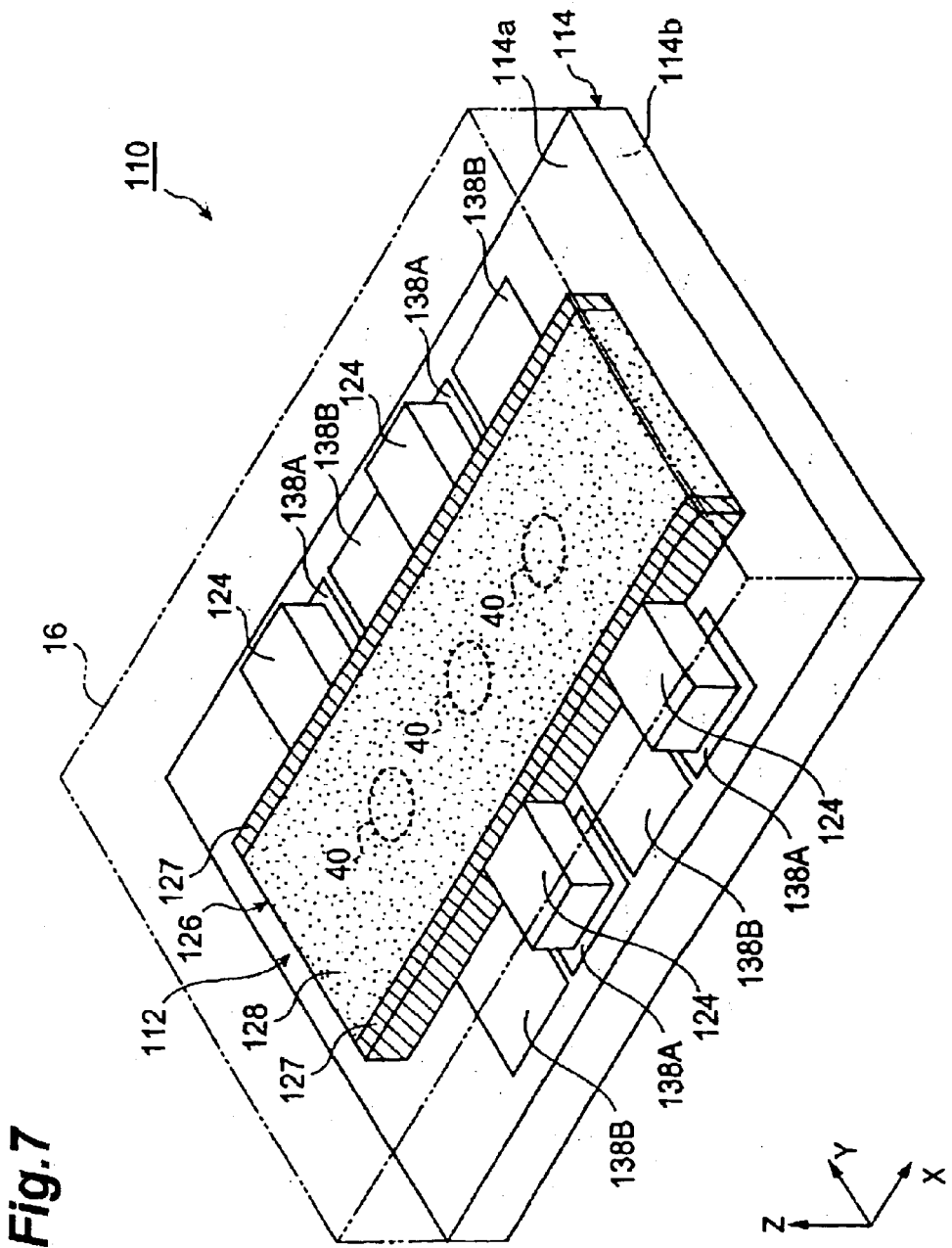
FIG. 7 is a perspective view showing the electrolytic capacitor in accordance with a second embodiment of the present invention.

(Second Embodiment) The electrolytic capacitor in accordance with a second embodiment will now be explained. FIG. 7 is a perspective view showing the electrolytic capacitor in accordance with the second embodiment of the present invention. As shown in FIG. 7, this electrolytic capacitor 110 comprises a capacitor device 112, a substrate 114 shaped like a rectangular thin sheet on which the capacitor device 112 is disposed, and a resin mold 116 which molds the capacitor device 112 and substrate 114.

As shown in FIG. 7, the capacitor device 112 is constituted by an accumulator 126 shaped like a rectangular thin sheet, and an even number of (e.g., two) pairs of anode parts 124, each shaped like a thin sheet, projecting outward from side faces of longer sides of the accumulator 126. In the following, for convenience of explanation, the longer and shorter side directions of the accumulator 126 will be referred to as X and Y directions, respectively, and a direction orthogonal to the X and Y directions will be referred to as Z direction.

As shown in FIG. 2, each anode part 124 is constituted by an aluminum base 18 formed with an aluminum oxide film 20. On the other hand, substantially all the areas (dotted parts in FIG. 7) of both sides and X-direction end faces of the aluminum base 18 formed with the aluminum oxide film 20 functioning as a dielectric in the accumulator 126 are covered with a cathode part 128 constituted by a solid high-molecular electrolytic layer 21, a graphite paste layer 22, and a silver paste layer 23.

A pair of anode parts 124 are formed on each side face in the longer sides of the accumulator 126, whereas each anode part 124 extends in the Y direction. The four anode parts 124 are positioned symmetrically about the center point of gravity of the accumulator 126. The center point of gravity is defined as a point on the surface of the accumulator 126 where its diagonal lines intersect.

An insulative resin layer 127 made of an epoxy or silicone resin is provided in each of marginal areas on the sides provided with the anode parts 124 in the surface region of the accumulator 126. The insulative resin layer 127 insulates the cathode part 128 and anode parts 124, which are attached to the accumulator 126, from each other more reliably.

The capacitor device 112 having the form mentioned above is shaped by punching an aluminum foil whose surface has been subjected to roughening and chemical conversion. Hence, the shaped aluminum foil is dipped into a chemical conversion solution, so as to form an aluminum oxide film at an end face of the foil where aluminum is exposed. A preferred example of the chemical conversion solution is an aqueous ammonium adipate solution having a concentration of 3%.

Figure 8:
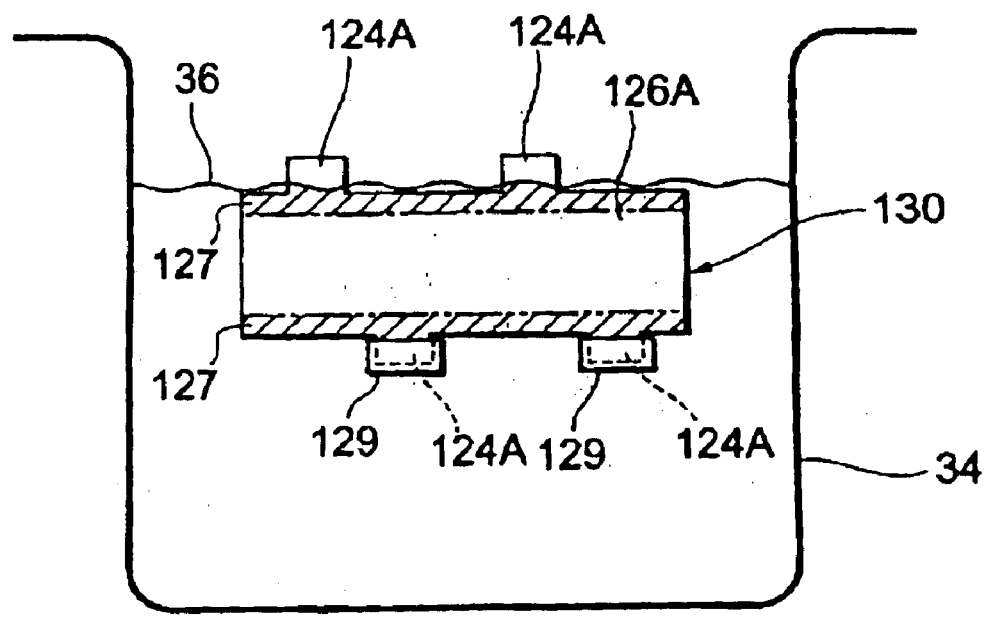
FIG. 8 is a view showing a state where an aluminum foil to become a capacitor device is subjected to anodization.

With reference to FIG. 8, a process to which the aluminum foil to become the capacitor device 112 is subjected will now be explained. FIG. 8 is a view showing a state where an aluminum foil 130 to become the capacitor device 112 is subjected to anodization. First, a marginal area on the side provided with parts 124A to become anode parts 124 in the surface region of a part 126A to become the accumulator 126 of the capacitor device 112 is formed with the insulative resin layer 127. Forming the insulating resin layer 127 at a predetermined area as such can reliably insulate and separate the anode parts 124 and cathode part 128, which will be formed in a later stage, from each other. Subsequently, the parts 124A on one end part side of the aluminum foil 130 are masked with a thermosetting insulative resin layer 129. Then, while being supported by the parts 124A on the other end part side, the aluminum foil 130 is dipped into a chemical conversion solution 36 contained in a stainless beaker 34. Thereafter, a voltage is applied such that thus supported aluminum foil part 124A and the stainless beaker 34 become positive and negative, respectively.

When anodization is started by voltage application, the chemical conversion solution 36 infiltrates upwards from the liquid level by way of the roughened surface of the aluminum foil 130 because of a capillary phenomenon. As a consequence, the aluminum oxide film 20 is formed over the whole roughened surface of the aluminum foil 30 including end faces. Thus produced aluminum foil 130 is formed with the cathode part 128 by a known method, and the insulative resin layer 129 is removed therefrom, whereby the making of the capacitor device 112 is completed.

Figure 9A:
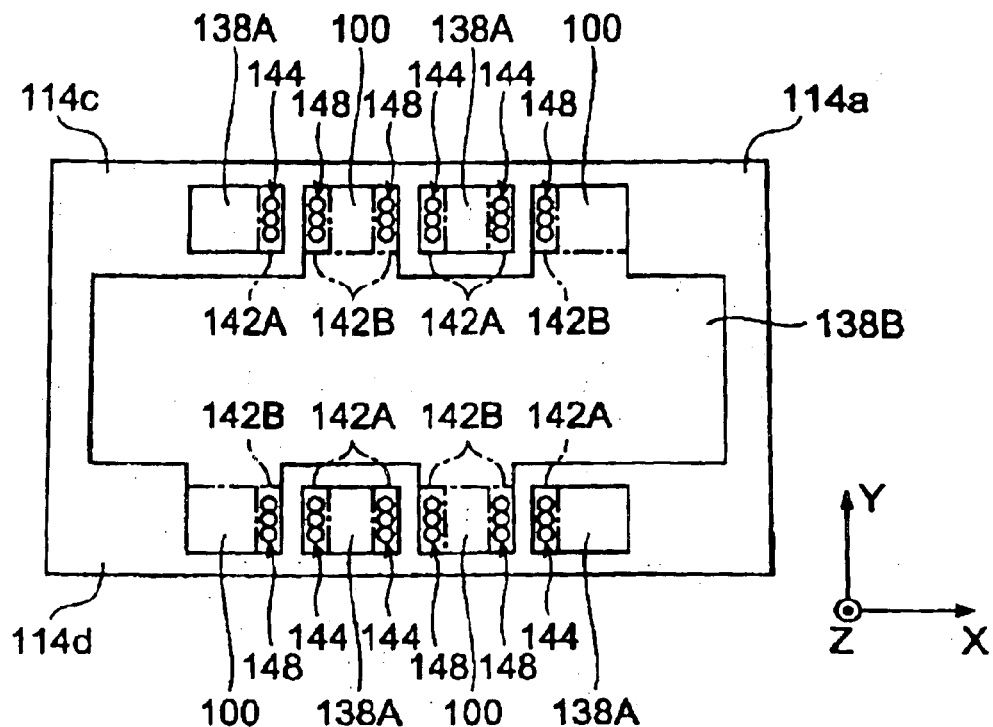
Figure 9B:
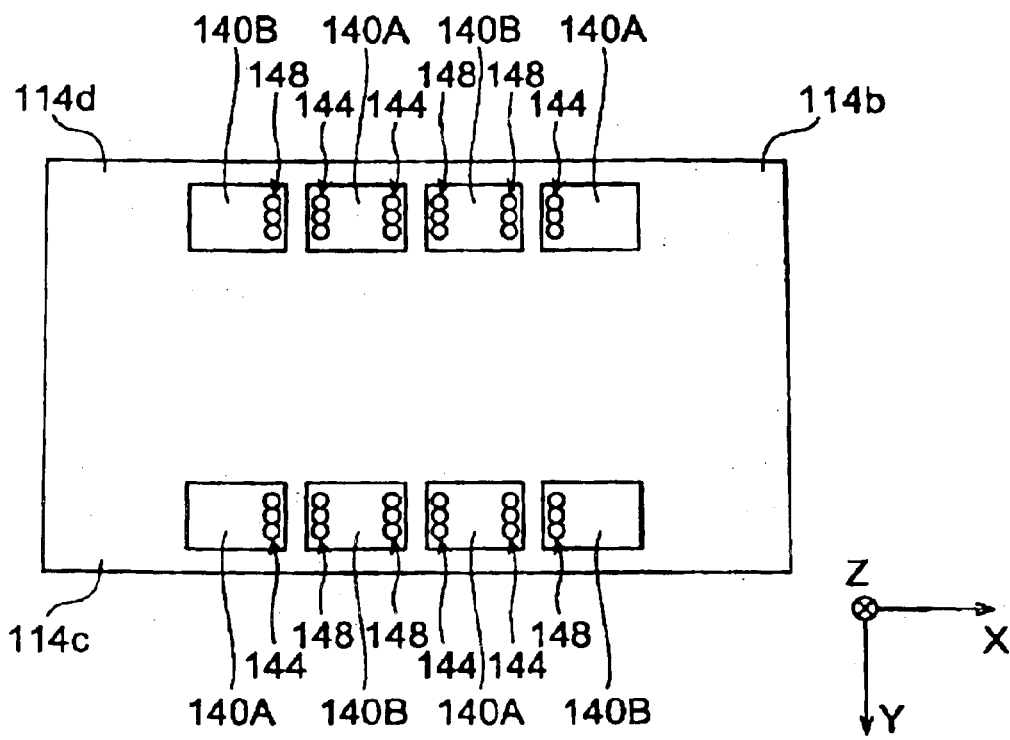
FIG. 9B is a view showing the backside of the device mounting surface of the substrate.

The substrate 114 on which the capacitor device 112 is mounted will now be explained with reference to FIGS. 9A and 9B. Here, FIG. 9A is a view showing a device mounting surface 114a of the substrate 114, whereas FIG. 9B is a view showing the backside 114b of the device mounting surface 114a of the substrate 114.

As with the substrate 14 of the electrolytic capacitor 10, the substrate 114 is a printed circuit board made of an FR4 material having both sides 114a, 114b printed with copper foil patterns with predetermined forms made by etching. On the backside 114b of the device mounting surface 114a on which the capacitor device 112 is mounted in the substrate 114, as shown in FIG. 9B, quadrangular land patterns 140 are formed so as to be arranged in a row along edges of opposing end parts 114c, 114d of the substrate 114. The land patterns 140 are disposed four by four at each of the end parts 114c, 114d, while being positioned close to each other with only a small distance therebetween. In the land patterns 140, anode land patterns 140A connected to the anode parts 124 of the capacitor device 112 and cathode land patterns 140B connected to the cathode part 128 alternate with each other. At positions corresponding to anode land patterns 140A, the device mounting surface 114a is formed with anode land patterns 138A, which have forms identical to those of the anode land patterns 140A and are connected to the anode parts 124 of the capacitor device 112 by resistance welding or metal spot welding with a YAG laser or the like.

At positions corresponding to the cathode land patterns 140B, the device mounting surface 114a is formed with a cathode electrode pattern 138B including quadrangular pattern parts (cathode protruded pattern parts) 100 which have forms identical to those of the cathode land patterns 140B and are connected to the second cathode part 128 of the capacitor device 112 by way of a conductive adhesive 40. The four quadrangular pattern parts 100 are connected to each other by the cathode electrode pattern 138B integrally including these quadrangular pattern parts 100 and the center area of the device mounting surface 114a. Namely, two quadrangular pattern parts 100 among the four quadrangular pattern parts 100 are arranged so as to face the cathode electrode pattern 138B on three sides, whereas the remaining two quadrangular pattern parts 100 are arranged so as to face the cathode electrode pattern 138B on two sides. Not only the case where the anode electrode patterns 138A and cathode electrode pattern 138B are simply positioned adjacent each other, but also the case where the anode electrode patterns 138A and cathode electrode pattern 138B are arranged as mentioned above is assumed to be in a state where they are adjacent each other.

Namely, each of the end parts 114c, 114d is provided with a pair of anode electrode patterns 138A and a pair of quadrangular pattern parts 100 which alternate with each other in the X direction, whereas each of edges of the adjacent anode electrode patterns 138A and quadrangular pattern parts 100 on the side close to each other extends along the Y direction. That is, a part of the anode electrode patterns 138A is interposed between the cathode protruded pattern parts 100, whereas a part of the cathode protruded pattern parts 100 formed in the cathode electrode pattern 138B is interposed between the anode electrode patterns 138A.

The anode electrode patterns 138A and anode land patterns 140B are connected to each other by anode vias 144 extending in the thickness direction (Z direction) of the substrate 114, whereas the quadrangular pattern parts 100 of the cathode electrode pattern 138B and the cathode land patterns 140B are connected to each other by cathode vias 148 extending in the thickness direction of the substrate 114. Three anode vias 144 are formed so as to be equally distanced along the Y direction in each of the marginal areas 142A on the quadrangular pattern part 100 sides in the regions formed with the anode electrode patterns 138A. Three cathode vias 148 are formed at the same intervals as those of the anode vias 144 along the Y direction in each of the marginal areas 142B on the anode electrode pattern 138A sides in the regions formed with the quadrangular pattern parts 100. Among the anode vias 144 and cathode vias 148, those corresponding to each other align with each other along the X direction.

In each of the quadrangular pattern parts 100 interposed between the adjacent anode electrode patterns 138A, three cathode vias 148 are formed in each of the opposing two marginal areas 142B. In each of the anode electrode patterns 138A interposed between the adjacent quadrangular pattern parts 100, three anode vias 144 are formed in each of the opposing two marginal areas 142A. Each of the anode vias 144 and cathode vias 148 has a circular cross section and is formed by electroless copper, plating of a circular through hole drilled in the substrate 114.

Namely, the anode vias 144 and cathode vias 148 are formed at one or two marginal areas 142A, 142B of each of the anode patterns 138 and quadrangular pattern parts 100 disposed close to each other, whereby the distance therebetween is significantly reduced. Also, each corresponding pair of the anode via 144 and cathode via 148 align with each other along the X direction in which the anode electrode patterns 138A and quadrangular pattern parts 100 align with each other, thereby minimizing the distance therebetween.

In the electrolytic capacitor 110, as explained in detail in the foregoing, the anode vias 144 are lopsidedly located in the marginal areas 142A of the anode electrode pattern 138A and are not formed in other areas of the anode electrode patterns 138A. On the other hand, the cathode vias 148 are lopsidedly located in the marginal areas 142B of the quadrangular pattern parts 100 of the cathode electrode pattern 138B and are not formed in other areas of the quadrangular pattern parts 100. Thus, each pair of the anode via 144 and cathode via 148 through which respective currents directed opposite from each other flow are located significantly close to each other, so as to lower the ESL. This decrease in ESL makes the electrolytic capacitor 110 achieve an impedance significantly lower than that of the conventional electrolytic capacitor.

In each of the anode electrode pattern parts 138A interposed between the quadrangular pattern parts 100 and each of the quadrangular pattern parts 100 interposed between the anode electrode pattern parts 138A, the anode vias 144 or cathode vias 148 are formed in each of the two opposing marginal areas, whereby all the anode vias 144 and cathode vias 148 are located close to each other even when the anode electrode pattern 138A and a part of the cathode electrode pattern 138B are arranged in a row. This significantly lowers the ESL of the electrolytic capacitor 110.

Figure 10:
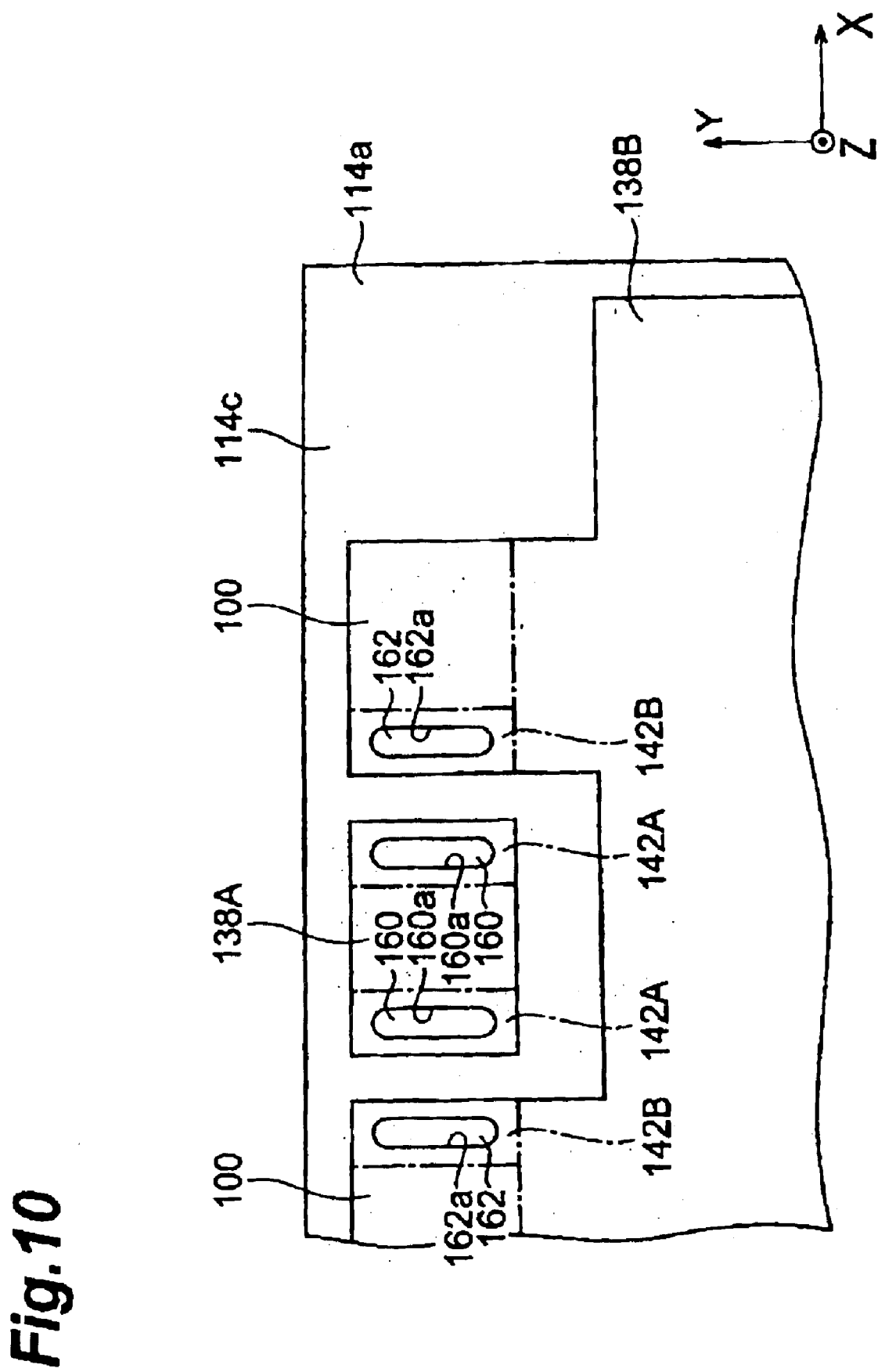
FIG. 10 is a view showing anode and cathode vias in a different mode of the electrolytic capacitor in accordance with the second embodiment.

In place of the anode vias 144 and cathode vias 148, those in the mode shown in FIG. 10 may be employed as well. FIG. 10 is a view showing anode and cathode vias in a different mode in the electrolytic capacitor 110 in accordance with the second embodiment. Namely, the anode via 160 and cathode via 162 are formed by filling respective elongated holes 160a and 162a extending in the Y direction along the marginal areas 142A and 142B with a conductive material (e.g., a metal material or a conductive resin) Such anode via 160 and cathode via 162 contribute to lowering the ESL over a wider area and thus are more effective in reducing the ESL than the anode and cathode vias not extending along marginal areas.

Without being restricted to the above-mentioned embodiments, the present invention can be modified in various manners. For example, the cross sections of the anode and cathode vias are not limited to circles and ovals but may be quadrangles, etc. The number of vias formed in marginal areas is not limited to 8 and 3, but may be increased or decreased as appropriate. The via may be changed to a via hole with a through center part as necessary.

Though the second embodiment shows the cathode electrode pattern 138B having quadrangular pattern parts projecting so that that cathode electrode pattern is interposed between two anode electrode patterns, the cathode electrode pattern is not limited to such a form and may have a form with no cathode protruded pattern part (i.e., a rectangular form), for example. The impedance of the electrolytic capacitor can significantly be reduced also in this case when the cathode vias are lopsidedly located in the marginal areas of the cathode electrode pattern on sides where the anode electrode patterns are positioned, while the anode vias are lopsidedly located in the marginal areas on the cathode electrode pattern side of the anode electrode patterns.

In the following, examples and comparative examples will be explained in order for effects of the present invention to be clarified more.

EXAMPLE 1

In the following manner, an electrolytic capacitor similar to the electrolytic capacitor 10 shown in FIG. 1 was produced.

First, from a roughened aluminum foil sheet, formed with an aluminum oxide film, having a thickness of 100 $\mu$m and yielding a capacitance of 270 $\mu$F/cm$^2$, an aluminum anode electrode body was produced by punching so as to attain a form identical to that of the aluminum foil 30 shown in FIG. 3 with a size of 4.7 mm×3.5 mm (an area of 0.165 cm$^2$) excluding the portion corresponding to the anode part. In thus punched electrode body, the roughened structure in the region (region corresponding to numeral 27 in FIG. 3) to be formed with an insulative resin layer was destroyed by pressing. In thus produced electrode body, only the surface of the pressed region (region corresponding to numeral 27 in FIG. 3) was coated with an epoxy resin.

Thus obtained electrode body was set in an aqueous ammonium adipate solution with a concentration of 3 wt % whose pH was adjusted to 6.0, such that the roughened aluminum foil formed with the aluminum oxide film was completely immersed therein. Here, the electrode body was dipped into the aqueous ammonium adipate solution up to a part of the area coated with the epoxy resin.

Subsequently, the electrode body dipped in the aqueous solution was oxidized while the part corresponding to the anode part not coated with the epoxy resin (corresponding to numeral 24A in FIG. 3) was used as an anode with a chemical conversion current density of 50 to 100 mA/cm$^2$ and a chemical conversion voltage of 12 V, whereby an aluminum oxide film was formed at the end face of the cut part of the electrode body.

Thereafter, the electrode body was lifted from the aqueous solution, and a solid high-molecular electrolytic layer made of polypyrrole was formed by chemical oxidative polymerization on the roughened surface of the aluminum foil. More specifically, the solid high-molecular electrolytic layer made of polypyrrole was produced by setting the electrode body into an aqueous ethanol mixed solution cell containing 0.1 mol/l of refined pyrrole monomer, 0.1 mol/l of sodium alkyl naphthalene sulfonate, and 0.05 mol/l of iron sulfate (III), such that only the roughened aluminum foil part formed with the aluminum oxide film (corresponding to numeral 26A in FIG. 3) was immersed therein, stirring the solution for 30 minutes so as to proceed with the chemical oxidative polymerization, and repeating the same operation three times. As a result, the solid high-molecular electrolytic layer having the maximum thickness of about 50 $\mu$m was formed.

The surface of thus laminated solid high-molecular electrolytic layer was coated with a carbon paste and a silver paste in succession, so as to form a cathode part similar to that of the cathode part 28 of the capacitor device 12 shown in FIG. 1.

Two capacitor devices, each produced as mentioned above, were prepared. Subsequently, the two capacitor devices were laminated such that their corresponding anode parts (corresponding to numeral 24 in FIG. 1) overlay each other, whereby a laminate of capacitor devices (capacitor laminate) was produced. The cathode parts (corresponding to numeral 28 in FIG. 1) of the capacitor devices were bonded together with a conductive adhesive.

The capacitor laminate was prepared by the foregoing steps.

In the following process, an electrolytic capacitor mounting substrate (7.3 mm×4.3 mm) whose front and rear faces were formed with the copper electrode patterns shown in FIG. 4A (the device mounting surface) and FIG. 4B (the backside of the device mounting surface), respectively, was prepared. Here, the electrolytic capacitor mounting substrate was a heat-resistant epoxy resin substrate containing glass cloth (FR4 substrate), in which the thickness of the substrate was 0.5 mm, whereas the thickness of the copper foil pattern was 36 $\mu$m.

First, the above-mentioned heat-resistant epoxy resin substrate containing glass cloth having a size of 100 mm×100 mm was prepared, and one face (front face) of this substrate was provided with a predetermined pattern (having the form identical to the electrode pattern shown in FIG. 4A) of a UV curable resist falling within the area of 7.3 mm×4.3 mm. On the surface of the substrate, 77 such resist patterns were formed. Similarly, the other face (rear face) of the substrate was provided with predetermined patterns (each having the form identical to the electrode pattern shown in FIG. 4B) in conformity to the positions of the resist patterns on the front face formed earlier.

Thereafter, using a known technique, unnecessary parts of the copper foil were chemically etched away, and the resist was peeled off, whereby predetermined electrode patterns were formed.

The processing within the device size area of 7.3 mm 4.3 mm of the electrolytic capacitor mounting substrate will now be explained.

Sixteen (eight pairs of) through holes (each having a diameter of 0.2 mm) were formed so as to connect predetermined positions (corresponding to the marginal areas 42A, 42B) of the first electrode pattern (anode electrode pattern; corresponding to the anode electrode pattern 38A in FIG. 4A) and second electrode pattern (cathode electrode pattern; corresponding to the cathode electrode pattern 38B in FIG. 4A) formed within one area of 7.3 mm×4.3 mm on the surface of the electrolytic capacitor mounting substrate to predetermined positions (corresponding to the marginal areas 46A, 46B) of the first electrode pattern (anode land pattern; corresponding to the anode land pattern 40A in FIG. 4B) and second electrode pattern (cathode land pattern; corresponding to the cathode land pattern 40B in FIG. 4B) on the rear face, respectively.

The through holes provided in the anode electrode pattern and their corresponding through holes provided in the cathode electrode pattern were paired with each other. The through holes in each pair have a distance (center distance) of 1 mm therebetween, and align with each other in the direction (X direction in FIGS. 4A and 4B) in which the marginal areas align with each other.

Thereafter, the inner walls of the through holes, the electrode pattern surface on the front face of the substrate, and the electrode pattern surface on the rear face of the substrate were coated with 3 $\mu$m of nickel by electroless plating. On thus formed nickel plating, gold was plated by 0.08 $\mu$m. Further, all the above-mentioned through holes were filled with copper plating, so as to form vias.

After forming the vias, the substrate was coated with an epoxy resin having a thickness of 50 $\mu$m, in order to form an insulative resin layer at predetermined areas (corresponding to the area of numeral 50 in FIG. 4A and the area of numeral 52 in FIG. 4B). At that time, all the end parts of vias on the front face were covered with the epoxy resin having a width of 2 mm, whereas all the end parts of vias on the rear face were covered with the epoxy resin such that only predetermined areas (marginal areas 50A, 50B) of the land patterns 40A, 405 were exposed.

Using a silver type conductive adhesive, the above-mentioned capacitor laminate was mounted on the substrate front face such that the cathode part on the lowermost face overlay the cathode electrode pattern of the substrate surface. The anode part of the capacitor laminate was welded and connected to the anode electrode pattern on the substrate surface by a YAG laser spot welding machine manufactured by NEC.

After securing the capacitor laminate onto the surface of the capacitor mounting substrate, the substrate and laminate were integrally molded with an epoxy resin by vacuum printing.

After the molding, the resulting product was cut into a discrete solid electrolytic capacitor #1 having a two-terminal structure with a size of 7.3 mm×4.3 mm as shown in FIG. 1. Thereafter, a predetermined voltage was applied to the solid electrolytic capacitor by a known method, so as to carry out aging, by which leakage current was lowered sufficiently, whereby the solid electrolytic capacitor was completed.

Electric characteristics of thus obtained solid electrolytic capacitor #1 were evaluated. Specifically, the solid electrolytic capacitor #1 was mounted on a predetermined evaluation substrate, and its capacitance and $S_{21}$ characteristic were measured by an impedance analyzer 4149A and a network analyzer 8753D which were manufactured by Agilent Technologies. According to thus obtained $S_{21}$ characteristic, an equivalent circuit simulation was carried out, so as to determine ESR and ESL values.

EXAMPLE 2

In the following manner, an electrolytic capacitor similar to the electrolytic capacitor shown in FIG. 7 was produced.

First, from a roughened aluminum foil sheet, formed with an aluminum oxide film, having a thickness of 100 $\mu$m and yielding a capacitance of 270 $\mu$F/cm$^2$, an aluminum anode electrode body was produced by punching so as to attain a form identical to that of the aluminum foil 130 shown in FIG. 8 with a size of 6.5 mm×3.0 mm (an area of 0.195 cm$^2$) excluding the four protruded parts (the parts referred to with numeral 124A). In thus punched electrode body, the roughened structure in the region (region corresponding to numeral 127 in FIG. 8) to be formed with an insulative resin layer was destroyed by pressing. In thus produced electrode body, only the surface of the pressed region (region corresponding to numeral 127 in FIG. 8) was coated with an epoxy resin.

Thereafter, only the protruded parts 124A on one side (two of the four anode parts) among the four protruded parts corresponding to the anode parts of the aluminum foil having the form shown in FIG. 8 were coated with a UV curable resist.

Thus obtained electrode body was set in an aqueous ammonium adipate solution with a concentration of 3 wt % whose pH was adjusted to 6.0, such that the roughened aluminum foil formed with the aluminum oxide film was completely immersed therein. Here, the electrode body was dipped into the aqueous ammonium adipate solution up to a part of the area coated with the epoxy resin.

Subsequently, the electrode body dipped in the aqueous solution was oxidized while the two protruded parts 124A not coated with the epoxy resin were used as an anode with a chemical conversion current density of 50 to 100 mA/cm$^2$ and a chemical conversion voltage of 12 V, whereby an aluminum oxide film was formed at the end face of the cut part of the electrode body.

Thereafter, the electrode body was lifted from the aqueous solution, and a solid high-molecular electrolytic layer made of polypyrrole was formed by chemical oxidative polymerization on the roughened surface of the aluminum foil. More specifically, the solid high-molecular electrolytic layer made of polypyrrole was produced by setting the electrode body into an aqueous ethanol mixed solution cell containing 0.1 mol/l of refined pyrrole monomer, 0.1 mol/l of sodium alkyl naphthalene sulfonate, and 0.05 mol/l of iron sulfate (III), such that only the roughened aluminum foil part formed with the aluminum oxide film (corresponding to numeral 126A in FIG. 8) was immersed therein, stirring the solution for 30 minutes so as to proceed with the chemical oxidative polymerization, and repeating the same operation three times. As a result, the solid high-molecular electrolytic layer having the maximum thickness of about 50 $\mu$m was formed.

The surface of thus laminated solid high-molecular electrolytic layer was coated with a carbon paste and a silver paste in succession, so as to form a cathode part similar to that of the cathode part 128 of the capacitor device 112 shown in FIG. 7. After the paste layers were formed, the coated UV curable resist was dissolved into an organic solvent and eliminated, so as to expose the unroughened two anode parts. A capacitor device (corresponding to the device 112 in FIG. 7) was produced by the foregoing process.

Two capacitor devices, each produced as mentioned above, were prepared. Subsequently, the two capacitor devices were laminated such that their corresponding anode parts (corresponding to numeral 124 in FIG. 7) overlay each other, whereby a laminate of capacitor devices (capacitor laminate) was produced. The cathode parts (corresponding to numeral 128 in FIG. 7) of the capacitor devices were bonded together with a conductive adhesive.

The capacitor laminate was prepared by the foregoing steps.

In the following process, an electrolytic capacitor mounting substrate (7.3 mm×4.3 mm) whose front and rear faces were formed with the copper electrode patterns shown in FIG. 9A (the device mounting surface) and FIG. 9B (the backside of the device mounting surface), respectively, was prepared. Here, as in Example 1, the electrolytic capacitor mounting substrate was a heat-resistant epoxy resin substrate containing glass cloth (FR4 substrate), in which the thickness of the substrate was 0.5 mm, whereas the thickness or the copper foil pattern was 36 $\mu$m.

First, the above-mentioned heat-resistant epoxy resin substrate containing glass cloth having a size of 100×100 mm was prepared, and one face (front face) of this substrate was provided with a predetermined pattern (having the form identical to the electrode pattern shown in FIG. 9A) of a UV curable resist falling within the area of 7.3 mm×4.3 mm. On the surface of the substrate, 77 such resist patterns were formed. Similarly, the other face (rear face) of the substrate was provided with predetermined patterns (each having the form identical to the electrode pattern shown in FIG. 9B) in conformity to the positions of the resist patterns on the front face formed earlier.

Thereafter, using a known technique, unnecessary parts of the copper foil were chemically etched away, and the resist was peeled off, whereby predetermined electrode patterns were formed.

The processing within the device size area of 7.3 mm×4.3 mm of the electrolytic capacitor mounting substrate will now be explained.

Four through holes (each having a diameter of 0.2 mm) were formed so as to connect the marginal areas 142A of four electrode patterns (anode electrode patterns; corresponding to the anode electrode patterns 138A in FIG. 9A) and marginal areas 142B of four electrode patterns (cathode protruded pattern parts; corresponding to the pattern parts 100 in FIG. 9A) formed within one area of 7.3 mm×4.3 mm on the surface of the electrolytic capacitor mounting substrate to predetermined positions of the four electrode patterns (anode land patterns; corresponding to the anode land patterns 140A in FIG. 9B) and four electrode patterns. (cathode land patterns; corresponding to the cathode land patterns 140B in FIG. 9B) on the rear face.

The through holes provided in the anode land patterns and their corresponding through holes provided in the cathode land patterns were paired with each other. The through holes in each pair have a distance (center distance) of 1 mm therebetween, and align with each other in the direction (X direction in FIGS. 9A and 9B) in which the marginal areas align with each other.

Thereafter, the inner walls of the through holes, the electrode pattern surface on the front face of the substrate, and the electrode pattern surface on the rear face of the substrate were coated with 3 $\mu$m of nickel by electroless plating. On thus formed nickel plating, gold was plated by 0.08 $\mu$m. Further, all the above-mentioned through holes were filled with copper plating, so as to form vias.

Using a silver type conductive adhesive, the above-mentioned capacitor laminate was mounted on the Substrate front face such that the cathode parts on the lowermost face overlay the cathode electrode patterns of the substrate surface. The anode parts of the capacitor laminate were welded and connected to their corresponding anode electrode patterns on the substrate surface by a YAG laser spot welding machine manufactured by NEC.

After securing the capacitor laminate onto the surface of the capacitor mounting substrate, the substrate and laminate were integrally molded with an epoxy resin by vacuum printing.

After the molding, the resulting product was cut into a discrete solid electrolytic capacitor #2 having an eight-terminal structure with a size of 7.3 mm×4.3 mm as shown in FIG. 7. Thereafter, a predetermined voltage was applied to the solid electrolytic capacitor by a known method, so as to carry out aging, by which leakage current was lowered sufficiently, whereby the solid electrolytic capacitor was completed.

Electric characteristics of thus obtained solid electrolytic capacitor #2 were evaluated. Specifically, the solid electrolytic capacitor #2 was mounted on a predetermined evaluation substrate, and its capacitance and $S_{21}$ characteristic were measured by an impedance analyzer 4149A and a network analyzer 8753D which were manufactured by Agilent Technologies. According to thus obtained $S_{21}$ characteristic, an equivalent circuit simulation was carried out, so as to determine ESR and ESL values.

COMPARATIVE EXAMPLE 1

In the following manner, a comparative electrolytic capacitor to be compared with the electrolytic capacitor in accordance with the above-mentioned Example 1 was produced.

Figure 11A:
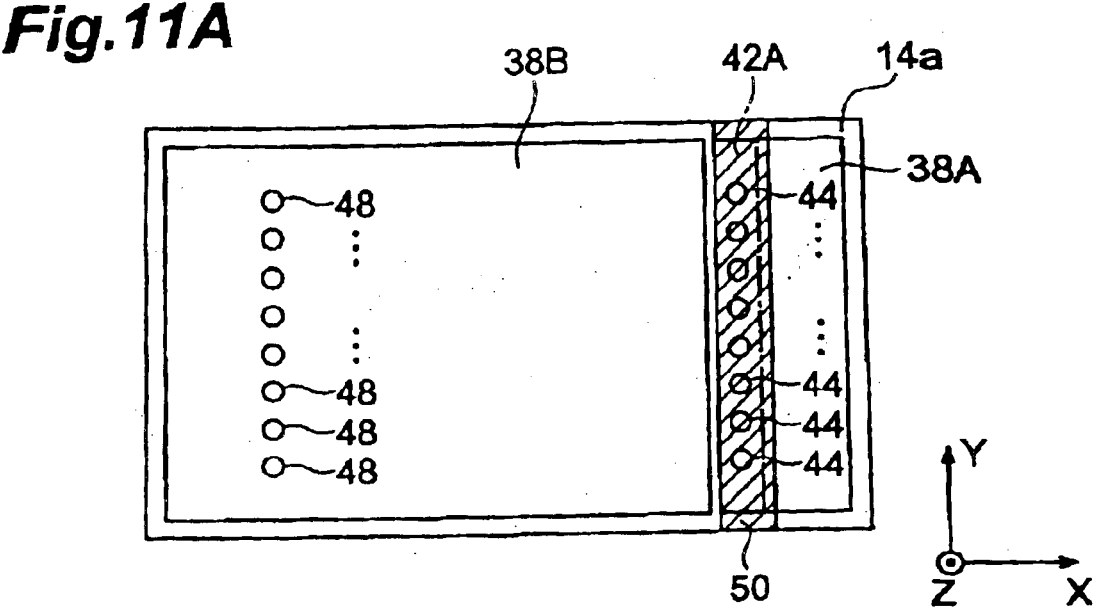
Figure 11B:
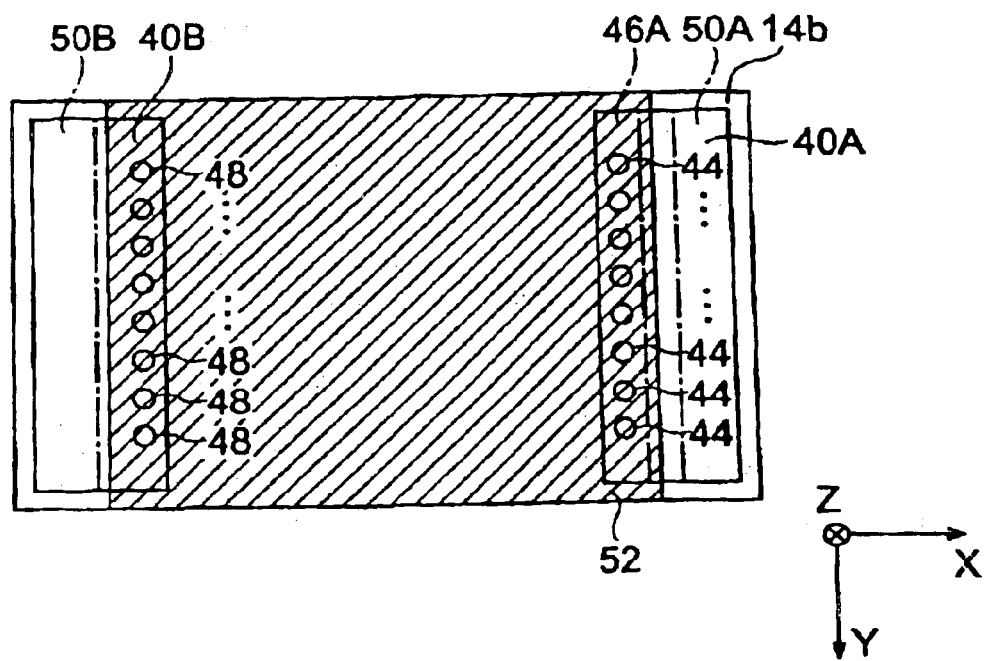
FIG. 11B is a view showing the backside of the device mounting surface of the comparative substrate.

Sixteen vias (each having a diameter of 0.2 mm) were formed in a capacitor mounting substrate formed with the electrode patterns shown in FIGS. 11A and 11. Here, the distance (center distance) between each corresponding pair of vial formed in the anode and cathode electrode patterns was set to 4 mm. Then, by the same method as that in the above-mentioned Example 1, an electrolytic capacitor #3 comprising this substrate was produced. Also produced was an electrolytic capacitor #4, which was an electrolytic capacitor similar to the electrolytic capacitor #3 but with a distance (center distance) of 5 mm between each corresponding pair of vias formed in the anode and cathode electrode patterns. Electric characteristics of thus produced electrolytic capacitors #3 and #4 were evaluated in the same manner as that in Example 1.

COMPARATIVE EXAMPLE 2

In the following manner, a comparative electrolytic capacitor to be compared with the electrolytic capacitor in accordance with the above-mentioned Example 2 was produced.

Figure 12A:
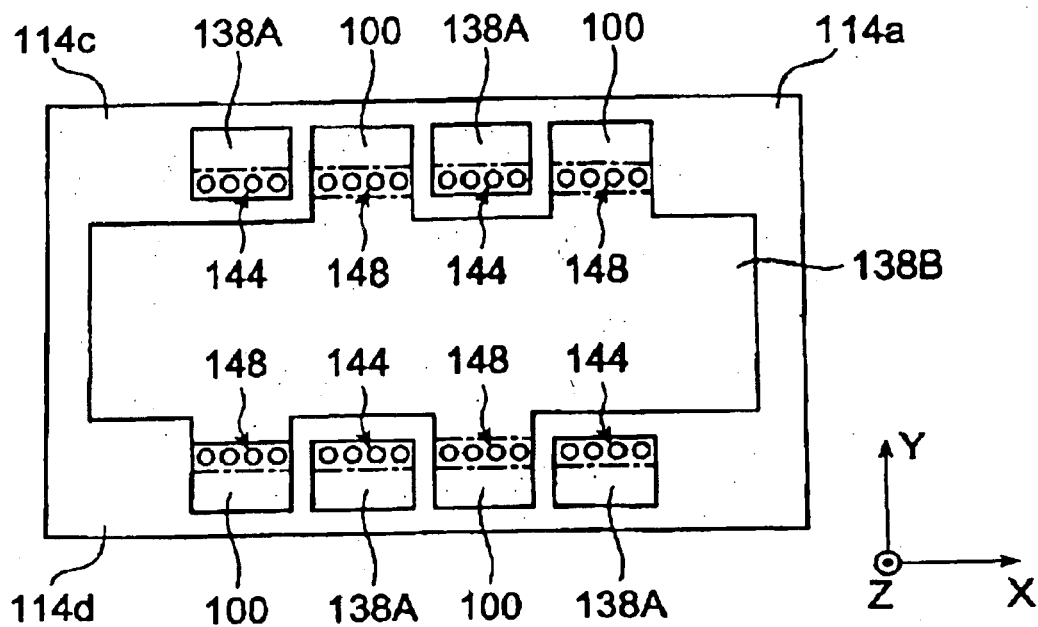
Figure 12B:
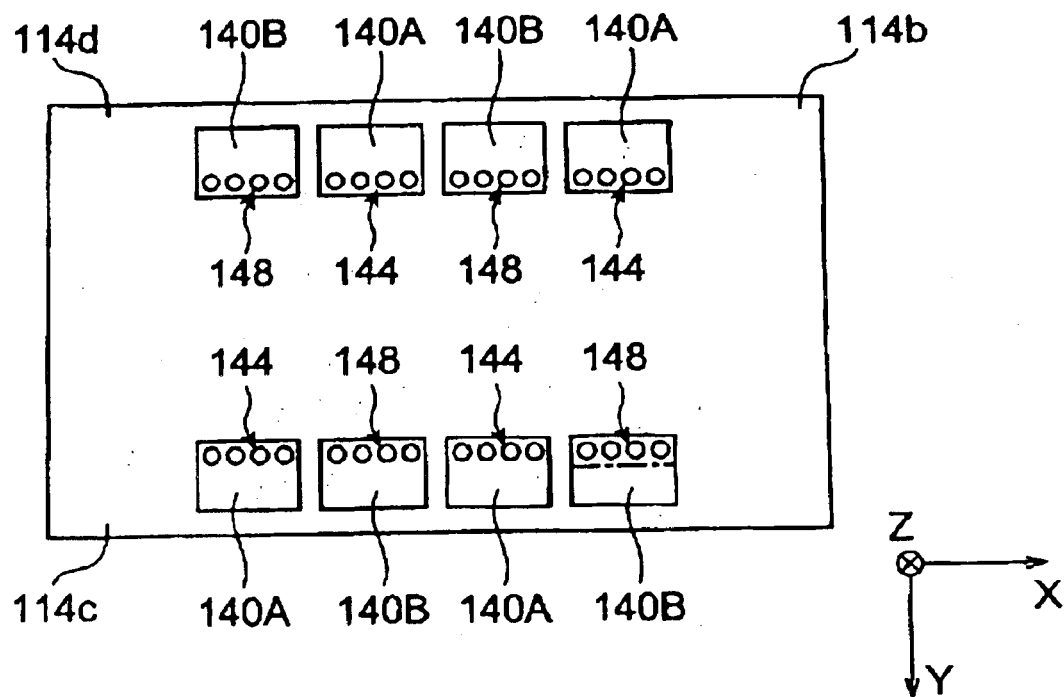
FIG. 12B is a view showing the backside of the device mounting surface of the comparative substrate.

A plurality of vias (each having a diameter of 0.2 mm) were formed in a capacitor mounting substrate formed with patterns similar to the electrode patterns in accordance with the above-mentioned Example 2. As shown in FIGS. 12A and 12B, these vias are arranged four by four in parallel along the X direction in the anode electrode patterns 138A and quadrangular pattern parts 100. An electrolytic capacitor #5 was produced by using this substrate, and its electric characteristics were evaluated by a technique similar to that of Example 2.

The following table summarizes the electric characteristics of the above-mentioned electrolytic capacitors #1 to #5.

|  | Capacitance (120 Hz) | ESR (100 kHz) | ESL |
| --- | --- | --- | --- |
| Electrolytic capacitor #1 | 70 μF | 15 mΩ | 250 pH |
| Electrolytic capacitor #3 | 69 μF | 16 mΩ | 550 pH |
| Electrolytic capacitor #4 | 71 μF | 16 mΩ | 600 pH |
| Electrolytic capacitor #2 | 102 μF | 13 mΩ | 170 pH |
| Electrolytic capacitor #5 | 100 μF | 14 mΩ | 330 pH |

The electrolytic capacitor #1 shown in Example 1 and the electrolytic capacitors #3, #4 shown in Comparative Example 1 are the same in terms of the electrode producing method, the insulative oxidized film forming method, the kind of solid high-molecular compound used, and the size of components. They differ from each other only in the center distance between the through holes (or vias) formed in the capacitor mounting substrate. Hence, the ESL of the electrolytic capacitor #1 is seen to have significantly been lowered since the ESL characteristics of the electrolytic capacitors #3, #4 in Comparative Example 1 are inferior to those in the electrolytic capacitor #1 in Example 1 when their characteristics are compared with each other.

The electrolytic capacitor #2 shown in Example 2 and the electrolytic capacitor #5 shown in Comparative Example 2 are the same in terms of the electrode producing method, the insulative oxidized film forming method, the kind of solid high-molecular compound used, and the size of components. They differ from each other only in arrangement patterns of the through holes (or vias) used in the capacitor mounting substrate. Hence, the ESL of the electrolytic capacitor #1 is seen to have significantly been lowered since the ESL characteristics of the electrolytic capacitor #5 in Comparative Example 2 are inferior to those in the electrolytic capacitor #2 in Example 2 when their characteristics are compared with each other.

Without being restricted to the foregoing embodiments and examples, the present invention can be modified in various manners within the scope of the invention defined in claims, and such modifications are also included in the scope of the present invention as a matter of course.

What is claimed is:

1. An electrolytic capacitor comprising:
a capacitor device formed with anode and cathode parts; and
a substrate having one face formed with an anode electrode pattern connected to the anode part and a cathode electrode pattern connected to the cathode part, the anode and cathode electrode patterns being adjacent to each other, the substrate being further formed with a first conductive path extending along a thickness of the substrate from the anode electrode pattern to the other face and a second conductive path extending along the thickness of the substrate from the cathode electrode pattern to the other face;
wherein the first conductive path is lopsidedly located in a marginal area of the anode electrode pattern on the cathode electrode pattern side; and wherein the second conductive path is lopsidedly located in a marginal area of the cathode electrode pattern on the anode electrode pattern side.

2. An electrolytic capacitor according to claim 1, wherein the anode electrode pattern is formed with a plurality of first conductive paths, the cathode electrode pattern being formed with the same number of second conductive paths as that of the first conductive paths; and wherein the first and second conductive paths corresponding to each other align with each other along a direction in which the anode and cathode electrode patterns align with each other.

3. An electrolytic capacitor according to claim 1, wherein each of the first and second conductive paths has a cross section extending in one direction, and wherein the first and second conductive paths corresponding to each other extend in parallel.

4. An electrolytic capacitor comprising a capacitor device having a plurality of anode parts formed on a base and a cathode part formed at an outer surface of the base excluding the anode parts; and
a substrate having one face formed with a plurality of anode electrode patterns connected to the respective anode parts and a cathode electrode pattern connected to the cathode part, the anode and cathode electrode patterns being adjacent to each other, the substrate being further formed with a first conductive path extending along a thickness of the substrate from each anode electrode pattern to the other face and a second conductive path extending along the thickness of the substrate from the cathode electrode pattern to the other face;
wherein the first conductive path is lopsidedly located in a marginal area of each anode electrode pattern on a side where the cathode electrode pattern is positioned, and wherein the second conductive path is lopsidedly located in each of a plurality of marginal areas of the cathode electrode pattern where the respective anode electrode patterns are positioned.

5. An electrolytic capacitor according to claim 4, wherein the cathode electrode pattern is formed with a cathode protruded pattern part projecting so that the cathode protruded pattern part is interposed between adjacent anode electrode patterns; and
wherein the second conductive paths are lopsidedly located in two marginal areas on respective sides of the cathode protruded pattern part where the adjacent anode electrode patterns are positioned.

6. An electrolytic capacitor according to claim 4, wherein the cathode electrode pattern is formed with a plurality of cathode protruded pattern parts projecting so that one of the anode electrode patterns is interposed between adjacent cathode protruded pattern parts; and
wherein the first conductive paths are lopsidedly located in two marginal areas of the anode electrode pattern held between the cathode protruded pattern parts where the respective cathode protruded pattern parts are positioned.

7. An electrolytic capacitor according to claim 5, wherein, in the anode electrode pattern and cathode protruded pattern part adjacent each other, marginal areas opposing each other are formed with a plurality of first conductive paths and a plurality of second conductive paths whose number is the same as that of the first conductive paths; and
wherein the first and second conductive paths corresponding to each other align with each other along a direction in which the anode electrode pattern and the cathode protruded pattern part align with each other.

8. An electrolytic capacitor according to claim 4, wherein each of the first and second conductive paths has a cross section extending in one direction, and wherein the first and second conductive paths corresponding to each other extend in parallel.

* * * * *